United States Patent
Ucar et al.

(10) Patent No.: US 11,256,937 B2
(45) Date of Patent: Feb. 22, 2022

(54) ANOMALOUS EVENT DETECTION AND/OR VALIDATION USING INHERENT HUMAN BEHAVIOR

(71) Applicant: Toyota Motor Engineering & Manufacturing North America, Inc., Plano, TX (US)

(72) Inventors: Seyhan Ucar, Mountain View, CA (US); Baik Hoh, Campbell, CA (US); Shalini Keshavamurthy, Sunnyvale, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1 day.

(21) Appl. No.: 16/931,846

(22) Filed: Jul. 17, 2020

(65) Prior Publication Data

US 2022/0019823 A1    Jan. 20, 2022

(51) Int. Cl.
G06K 9/00    (2006.01)
G06K 9/62    (2006.01)
H04W 4/46    (2018.01)

(52) U.S. Cl.
CPC ..... G06K 9/00845 (2013.01); G06K 9/00791 (2013.01); G06K 9/6254 (2013.01); G06K 9/6256 (2013.01); H04W 4/46 (2018.02)

(58) Field of Classification Search
None
See application file for complete search history.

(56) References Cited

U.S. PATENT DOCUMENTS 8,350,696 B2    1/2013   McClellan et al.
9,714,037 B2    7/2017   DeRuyck et al.
(Continued)

FOREIGN PATENT DOCUMENTS

CN    112655034 A  *  4/2021    ............ G08B 21/02
CN    109325755 B  *  8/2021
(Continued)

OTHER PUBLICATIONS

Mihelj et al., "Crowdsourced Traffic Event Detection and Source Reputation Assessment Using Smart Contracts", MDPI, Published Jul. 25, 2019 (17 pages).
(Continued)

*Primary Examiner* — Mohammed Rachedine
(74) *Attorney, Agent, or Firm* — Christopher G. Darrow; Darrow Mustafa PC

(57) ABSTRACT

Anomalous events in a driving environment can be detected and/or validated by leveraging inherent human behavior. A notification of the anomalous event can be received from an initial connected entity in the driving environment. In response, an inquiry can be sent to connected entities spatiotemporally related to the initial connected entity as to whether any person associated with the connected entities is exhibiting an inherent human behavior. When a threshold level of responses to the inquiry are received from the connected entities indicating that an inherent human behavior has been detected, the one or more connected entities can be caused to upload driving scene data for at least a time when the inherent human behavior by the occupant of the connected vehicle was detected.

26 Claims, 6 Drawing Sheets

(56) References Cited

U.S. PATENT DOCUMENTS

| | | | |
|---|---|---|---|
| 10,359,782 B1 | 7/2019 | Hayward | |
| 10,950,065 B1* | 3/2021 | Fields | G07C 5/0816 |
| 2018/0284759 A1* | 10/2018 | Michalakis | B60W 30/16 |
| 2020/0219386 A1* | 7/2020 | El Assaad | H04W 4/44 |
| 2020/0250982 A1* | 8/2020 | Kim | G08G 1/163 |

FOREIGN PATENT DOCUMENTS

| | | | | |
|---|---|---|---|---|
| EP | 1695310 B1 | | 9/2008 | |
| KR | 20200095383 A | * | 8/2020 | G06K 9/6256 |
| WO | WO-2018115963 A2 | * | 6/2018 | B60W 10/04 |

OTHER PUBLICATIONS

Lappi, " Eye movements in the wild: oculomotor events, gaze behavior and frames of reference", Neuroscience & Behavioral Reviews, 69, 49-68, Jun. 6, 2016 (41 pages).

Lappi et al., "Systematic Observation of an Expert Driver's Gaze Strategy—An On-Road Case Study", Frontiers, Apr. 27, 2017 (34 pages).

\* cited by examiner

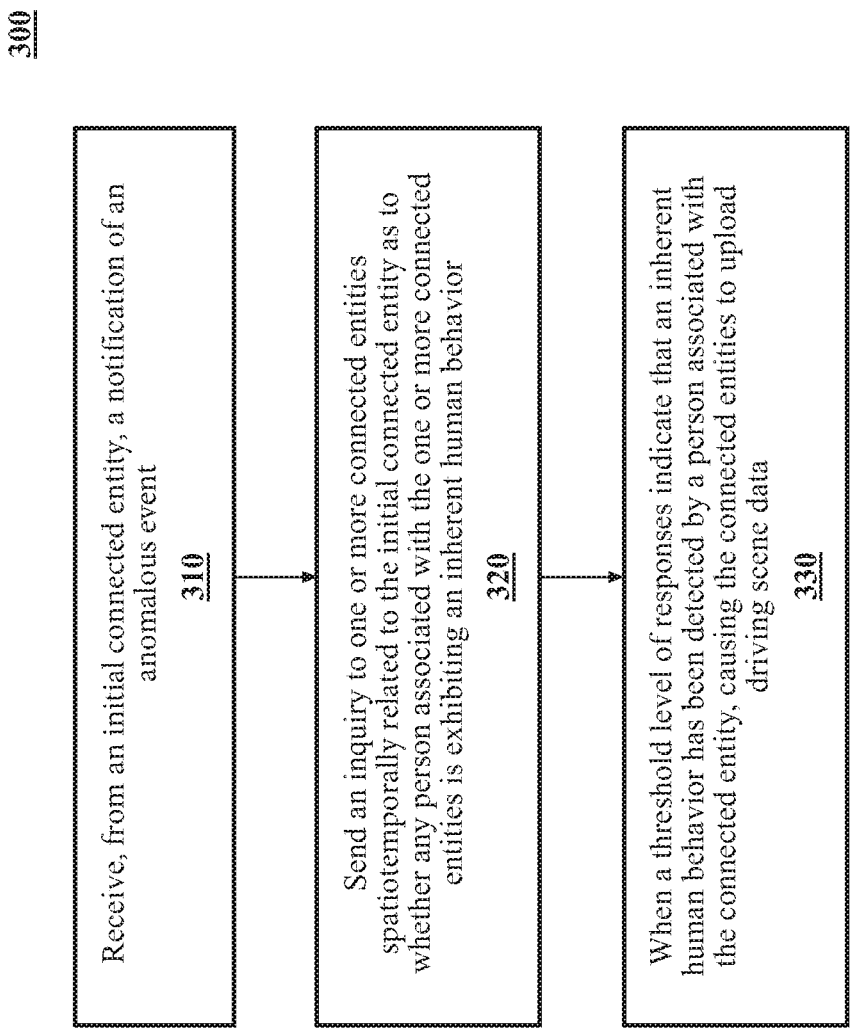

ANOMALOUS EVENT DETECTION AND/OR VALIDATION USING INHERENT HUMAN BEHAVIOR

FIELD

The subject matter described herein relates in general to vehicles and, more particularly, to event detection and/or validation in a driving environment.

BACKGROUND

While a vehicle is in use, there are numerous things in the external environment that can capture the attention of a vehicle occupant. Sometimes, an unexpected occurrence can provoke a reaction from the vehicle occupant. For instance, there may be an explosion in the environment. A vehicle occupant may tend to naturally flinch when he or she hears the explosion.

SUMMARY

In one respect, the present disclosure is directed to a method of detecting and/or validating an anomalous event in a driving environment. The method can include receiving, from a connected vehicle in a driving environment, a notification that an inherent human behavior by an occupant of the connected vehicle has been detected. The method can include sending an inquiry to one or more connected entities spatiotemporally related to the connected vehicle as to whether any person associated with the one or more connected entities is exhibiting an inherent human behavior. The method can further include, when a threshold level of responses to the inquiry are received from one or more of the one or more connected entities indicating that an inherent human behavior has been detected, causing the one or more connected entities to upload driving scene data for at least a time when the inherent human behavior by the occupant of the connected vehicle was detected.

In another respect, the present disclosure is directed to a system for detecting and/or validating an anomalous event in a driving environment. The system can include one or more processors. The one or more processors can be programmed to initiate executable operation. The executable operations can include receiving, from a connected vehicle in a driving environment, a notification that an inherent human behavior by an occupant of the connected vehicle has been detected. The executable operations can include sending an inquiry to one or more connected entities spatiotemporally related to the connected vehicle as to whether any person associated with the one or more connected entities is exhibiting an inherent human behavior. The executable operations can further include, when a threshold level of responses to the inquiry are received from one or more of the one or more connected entities indicating that an inherent human behavior has been detected, causing the one or more connected entities to upload driving scene data for at least a time when the inherent human behavior by the occupant of the connected vehicle was detected.

In still another respect, the present disclosure is directed to a computer program product for detecting and/or validating an anomalous event in a driving environment. The computer program product can include a computer readable storage medium having program code embodied therewith. The program code executable by a processor to perform a method that can include receiving, from a connected vehicle in a driving environment, a notification that an inherent human behavior by an occupant of the connected vehicle has been detected. The method can also include sending an inquiry to one or more connected entities spatiotemporally related to the connected vehicle as to whether any person associated with the one or more connected entities is exhibiting an inherent human behavior. The method can further include, when a threshold level of responses to the inquiry are received from one or more of the one or more connected entities indicating that an inherent human behavior has been detected, causing the one or more connected entities to upload driving scene data for at least a time when the inherent human behavior by the occupant of the connected vehicle was detected.

BRIEF DESCRIPTION OF THE DRAWINGS

FIG. 3 is an example of an anomalous event detection method.

DETAILED DESCRIPTION

Figure 1:
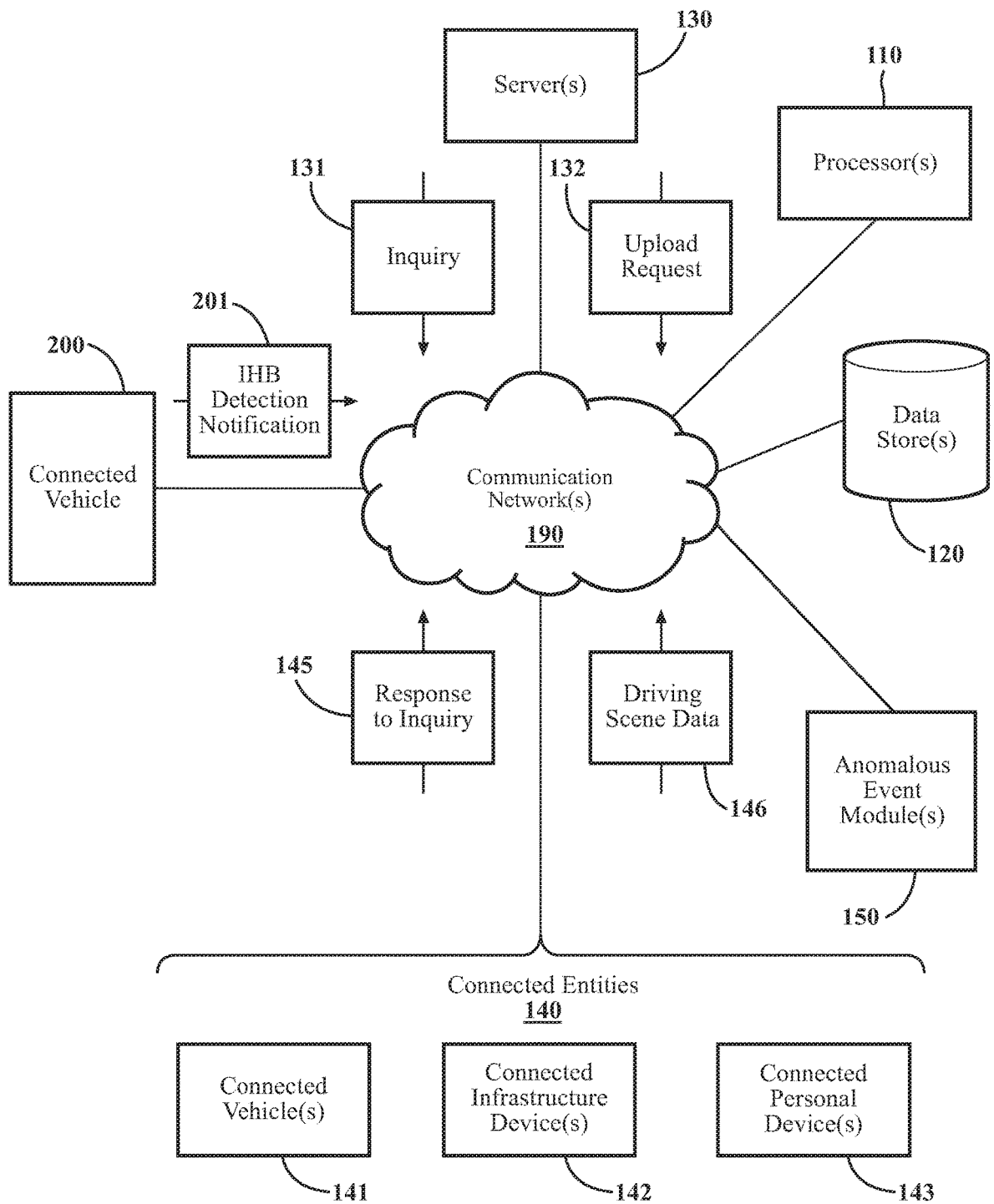
FIG. 1 is an example of an anomalous event detection system.

Human beings are naturally yet paradoxically drawn to some distasteful things, such as car accidents, car chases, potential crashes, fights, and natural disasters. When encountering such thing, humans exhibit certain inherent behaviors. Rubbernecking is one example of an inherent human behavior that may occur when a human is drawn to something of interest. Rubbernecking is the act of staring at something of interest. The term rubbernecking refers to the physical action of a human stretching his or her neck to get a better view of the thing of interest. In a vehicular context, rubbernecking refers to a driver slowing down in order to see something on or near the road, such as a traffic accident. This activity is also referred to as gawking. When a human driver rubbernecks, traffic flow can be adversely affected, and it may increase the likelihood of the driver being in an accident due to the distraction. While rubbernecking can be problematic in a driving context, this inherent human behavior can also provide useful information.

According to arrangements described herein, inherent human behavior (e.g., rubbernecking, near-rubbernecking, facial expressions, shouting, excited utterances, etc.) can be leveraged to detect and/or validate anomalous events in a driving environment. Human beings are good at identifying interesting or anomalous scenes in a driving environment, and machines are good art capturing the details of a driving scene using onboard sensors. According to arrangements herein, a human-machine collaboration can used to detect and capture useful data about a driving environment. Arrangements described herein can retain the advantages of humans and machines to create a human-inspired machine cognitive system.

As used herein, an "anomalous event" can be any unusual occurrence happening on or near a road that is different from what is typical for that area and/or at that time. Non-limiting examples of anomalous events can include road anomaly, pedestrian anomaly, traffic incidents and/or accidents, vehicle behavior anomaly, aggressive drivers, drunk drivers, vehicle malfunctioning, road work or construction, lane closures, and travel of ambulance, police car and/or fire engine.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

FIG. 1 is an example of an anomalous event system 100. Some of the possible elements of the anomalous event system 100 are shown in FIG. 1 and will now be described. It will be understood that it is not necessary for the anomalous event system 100 to have all of the elements shown in FIG. 1 or described herein. The anomalous event system 100 can include one or more processors 110, one or more data stores 120, one or more servers 130, one or more connected entities 140, a connected vehicle 200, and one or more anomalous event modules 150.

The various elements of the anomalous event system 100 can be communicatively linked through one or more communication networks 190. As used herein, the term "communicatively linked" can include direct or indirect connections through a communication channel or pathway or another component or system. A "communication network" means one or more components designed to transmit and/or receive information from one source to another. The communication network(s) 190 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network(s) 190 further can be implemented as or include one or more wireless networks, whether short or long range. For example, in terms of short range wireless networks, the communication network(s) 190 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network(s) 190 can include a mobile, cellular, and or satellite-based wireless network and support voice, video, text, and/or any combination thereof. Examples of long range wireless networks can include GSM, TDMA, CDMA, WCDMA networks or the like. The communication network(s) 190 can include wired communication links and/or wireless communication links. The communication network(s) 190 can include any combination of the above networks and/or other types of networks. The communication network(s) 190 can include one or more routers, switches, access points, wireless access points, and/or the like. In one or more arrangements, the communication network(s) 190 can include Vehicle-to-Vehicle (V2V), Vehicle-to-Infrastructure (V2I), Vehicle-to-Cloud (V2C), or Vehicle-to-Everything (V2X) technology, which can allow for communications between the connected vehicle 200, the connected entities 140, and/or the server(s) 130.

One or more elements of the anomalous event system 100 include and/or can execute suitable communication software, which enables two or more of the elements to communicate with each other through the communication network(s) 190 and perform the functions disclosed herein.

As noted above, the anomalous event system 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other.

The anomalous event system 100 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. The term "operatively connected," as used throughout this description, can include direct or indirect connections, including connections without direct physical contact.

The anomalous event system 100 can include one or more servers 130. The server(s) 130 can be located remote from the connected vehicle 200 and/or the connected entities 140. The server(s) 130 can be any type of server, now known or later developed. In some arrangements, the server(s) 130 can be cloud-based server(s) or edge server(s). The server(s) 130 can communicate with the connected vehicle 200 and/or with the connected entities 140 over the communication network 190.

The anomalous event system 100 can include a connected vehicle 200. The connected vehicle 200 will be described in more detail in connection with FIG. 2. The connected vehicle 200 can be configured to detect whether a vehicle occupant (e.g., driver and/or passenger(s)) is exhibiting an inherent human behavior. If so, the connected vehicle 200 can be configured to send a notification on an inherent human behavior detection (IHB) to the server(s) 130. The connected vehicle 200 can be configured to acquire driving environment data. In some instances, driving environment data acquired by the connected vehicle 200 can be sent to the server(s) 130.

The anomalous event system 100 can include one or more connected entities 140. A connected entity can include any device that is communicatively coupled to the server(s) 130. Non-limiting examples of the connected entities 140 includes one or more other connected vehicles 141, one or more connected infrastructure devices 142, and/or one or more connected personal devices 143. With respect to the other connected vehicles 141, the discussion below of the connected vehicle 200 applies equally to the other connected vehicles 141.

Regarding the connected infrastructure device(s) 142, an "infrastructure device" can be any device positioned along or near a road or other travel path. The connected infrastructure device(s) 142 can include one or more sensors for sensing the surrounding environment and/or for sensing vehicle occupants or pedestrians in the environment. The connected infrastructure device(s) 142 can be, for example, a CCTV camera, a roadside camera, a street light, traffic light, a smart traffic light, a traffic sign, a road sign, a billboard, a bridge, a building, a pole, or a tower, just to name a few possibilities. In some instances, the connected infrastructure device(s) 142 can be a road itself when the operative components are embedded therein. In some arrangements, the connected infrastructure device(s) 142 can be configured to send and/or receive information to the server(s) 130.

The connected personal device(s) 143 can include any portable device worn or carried by a person, now known or later developed. The connected personal device(s) 143 can include one or more environment sensors for sensing at least a portion of the surrounding environment of the connected personal device(s) 143. The discussion of the environment sensors 244 in connection with FIG. 2 below is applicable to the environment sensors of the connected personal device(s) 143. The connected personal device(s) 143 can include one or more sensors for detecting data about a person associated with the connected personal device(s) 143. The discussion of the occupant sensors 242 in connection with FIG. 2 below is applicable to the sensors for detecting data about a person associated with the connected personal device(s) 143.

Examples of the connected personal device(s) 143 can include a telephone (e.g., a cellular telephone, a smart phone, etc.) a computer (e.g., a laptop, a tablet, a phablet, etc.), and/or any other a portable computing device. In one or more arrangements, the connected personal device(s) 143 can include a smart watch, smart eye glasses, smart jewelry (e.g., neckless, earrings, bracelets, etc.), gaze tracking enabled goggles, smart contact lenses, and/or smart clothing (e.g., a shirt, hat, or other article of clothing enabled for wireless communication).

The anomalous event system 100 can include one or more anomalous event modules 150. The anomalous event module(s) 150 can be implemented as computer readable program code that, when executed by a processor, implement one or more of the various processes described herein.

The anomalous event module(s) 150 and/or the data store(s) 120 can be components of the processor(s) 110 and/or the server(s) 130. In one or more arrangements, the anomalous event module(s) 150 and/or the data store(s) 120 can be stored on, accessed by and/or executed on the processor(s) 110 and/or server(s) 130. In one or more arrangements, the anomalous event module(s) 150 and/or the data store(s) 120 can be executed on and/or distributed among other processing systems to which the processor(s) 110 and/or server(s) 130 are communicatively linked. In one or more arrangements, the anomalous event module(s) 150 can include artificial or computational intelligence elements, e.g., neural network, fuzzy logic or other machine learning algorithms.

The anomalous event module(s) 150 can include instructions (e.g., program logic) executable by a processor. Alternatively or in addition, one or more of the data stores 120 may contain such instructions. Such instructions can include instructions to execute various functions and/or to transmit data to, receive data from, interact with, and/or control one or more elements of the anomalous event system 100. Such instructions can enable the various elements of the anomalous event system 100 to communicate through the communication network 190.

The anomalous event module(s) 150 can be configured to receive a notification 201 from the connected vehicle 200 that an inherent human behavior (IHB) by an occupant of the connected vehicle 200 has been detected.

The anomalous event module(s) 150 can be configured, response to receiving the notification 201, to send an inquiry 131 to one or more connected entities 140. The connected entities 140 can be spatiotemporally related to the connected vehicle 200. "Spatiotemporally related" includes the connected entities 140 being related to the connected vehicle 200 in time only, space only, both time and space, and/or in other ways. A connected entity 140 can be spatiotemporally related to the connected vehicle 200 either at the present moment in time or at or near the located of the connected vehicle 200 when the inherent human behavior was detected. "Spatiotemporally related" can include connected entities that are located within a distance from the connected vehicle 200, either at the present time or when the inherent human behavior was detected. The distance can be a predetermined distance, or it can be varied based on real-time conditions. In some arrangements, "spatiotemporally related" can include being within 100 meters or less, within 50 meters or less, or some other threshold. In some arrangements, "spatiotemporally related" can include a sufficient size so that a sufficient number of co-located notifications can potentially be received so that a conclusion can be made as to whether the inherent human behaviors correspond to a single identical anomalous event.

It should be noted that "spatiotemporally related" can include prospective and retrospective analysis. As an example of a prospective analysis, connected entities that are approaching a static anomalous event and/or connected entities on the future path of a moving anomaly can be queried. In the case of a retrospective analysis, connected entities that already passed a static anomalous event and/or connected entities that have been passed by a dynamic anomalous event can be queried.

The inquiry 131 can include a request for the connected entities 140 to determine whether any person associated with the one or more connected entities 140 is exhibiting an inherent human behavior. In such case, the connected entities 140 can do so by analyzing data about the person as acquired by one or more sensors of the connected entities 140. In some instances, the anomalous event module(s) 150 can be configured to send inquiries to connected entities 140 downstream or upstream of the location of the connected vehicle 200 when the inherent human behavior was detected.

The anomalous event module(s) 150 can be configured to receive responses 145 to the inquiry from the one or more connected entities 140. The responses 145 can indicate whether or not an inherent human behavior was detected. In some instance, the responses 145 can be accompanied by a probability that an inherent human behavior is occurring. In some instances, the responses 145 can include one or more images of the vehicle occupant. The images can be sent with the consent of the vehicle occupant. In such case, the anomalous event module(s) 150, or a human reviewer, can review the images to confirm that an inherent human behavior is actually occurring, thereby improving accuracy and/or reliability. In some cases, the image data can be used when there are very few of no other connected vehicles spatiotemporally related to the connected vehicle 200. The images can be of a lower resolution so as not to overburden the anomalous event system 100. In some instances, the responses 145 can include other information, such as direction of vehicle travel, gaze direction of vehicle occupant, location, etc.

The anomalous event module(s) 150 can be a machine learning model. The anomalous event module(s) 150 can be configured to learn over time. For example if the machine learning model cannot come to a consensus as to whether there is an anomaly in the driving environment, it can delegate this task to a human reviewer. The human reviewer can determine whether the received event is anomaly or not. The human reviewer can put some tags, points so the machine learning algorithm can learn from him/her. For the next time, the anomalous event module(s) 150 does not need to as human support. It has already learned.

The anomalous event module(s) 150 can be configured to take further action when a threshold level of responses to the inquiry, indicating that an inherent human behavior has been detected, are received from one or more of the one or more connected entities 140. The threshold level can be a predetermined threshold, or it can be a dynamic threshold based on real-time conditions in the driving environment. For instance, if there is only one connected entity 140 located in the relevant area, then the threshold can be one. However, if there are numerous connected entities 140 located in the relevant area, then the threshold can be set at any suitable level. The threshold can be a number, a percentage, a range, etc. It should be noted that the inherent human behavior does not have to be identical for the connected entities 140. For instance, some connected entities 140 may detect rubbernecking, and some connected entities 140 may detect some other kind of inherent human behavior.

When the threshold level is reached, the anomalous event module(s) 150 can be configured to cause the one or more connected entities 140 to upload driving scene data 146 for at least the time when the connected entity 140 was at or near the location of the connected vehicle 200 when the inherent human behavior by the occupant of the connected vehicle 200 was detected. For instance the anomalous event module(s) 150 can send an upload request 132 to the connected entities 140. The upload request 132 can also be sent to the connected vehicle 200.

In some instances, the threshold level may not be reached. For instance, there may not be any other spatiotemporally related connected entities. Alternatively, the persons associated with the other connected entities may not exhibit an inherent human behavior. In such case, the anomalous event module(s) 150 can be configured to ignore the notification 201 of the inherent human behavior detection received from the connected vehicle 200.

The driving scene data 146 received from the connected entities 140 and/or the connected vehicle 200 can be used for any suitable purposes. In some instances, the driving environment data can be stored in the data stores(s) 120 for later review and/or analysis.

The anomalous event module(s) 150 can be configured to analyze the driving scene data 146 to detect and/or identify any anomalous event therein. In some instance, the anomalous event module(s) 150 can be configured to analyze the received driving scene data 146 using machine learning or deep learning techniques to detect and/or identify an anomalous event in the driving scene data 146. Alternatively or in addition, the anomalous event module(s) 150 can be configured to send the driving scene data 146 to one or more human reviewers. The human reviewer(s) can analyze the driving scene data 146 to detect and/or identify an anomalous event in the driving scene data 146. The human reviewer(s) can annotate the driving scene data 146 as appropriate.

In some arrangements, the anomalous event module(s) 150 can be configured to request assistance from occupants of connected entities 140 that approaching the potential anomalous event. For instance, the anomalous event module(s) 150 can be configured to send an inquiry to one or more of such connected entities 140. The connected entities 140 can present the query to a person associated with the connected entity 140. For instance, the connected entity 140 may ask "What is the anomaly?" In such case, the person can respond audibly, and the response can be sent to the anomalous event module(s) 150. Alternatively, a menu of predetermined choices can be presented to the person by the connected entity 140, such as on a display. For instance, the user can select the appropriate choice, such as via a touch screen.

The anomalous event module(s) 150 can be configured to determine whether the anomalous event is a static event (e.g., an event that is stationary or confined to a certain area) or a dynamic event (e.g., the event is moving). As an example, the static event can be a car crash or a lane closure. As another example, the dynamic event can be an aggressive driver or a drunk driver. The anomalous event module(s) 150 can be configured to analyze the driving environment scene data to determine whether the event is static or dynamic.

If the anomalous event is static in nature, the anomalous event module(s) 150 can be configured to perform retrospective inherent human behavior detection. For instance, the anomalous event module(s) 150 can be configured to explore with connected entities 140 that have already passed the anomalous event to determine whether the persons associated with the connected entities 140 exhibited an inherent human behavior when at or near the anomalous event.

If the anomalous event is dynamic in nature, the anomalous event module(s) 150 can be configured to perform prospective inherent human behavior detection. For instance, the anomalous event module(s) 150 can be configured to identify connected entities on the way of moving anomalies. The anomalous event module(s) 150 can be configured to instruct such connected entities to perform inherent human behavior detection.

When an anomalous event is detected in the driving scene data 146, the anomalous event module(s) 150 can be configured to take one or more actions. For instance, the driving scene data 146 can be annotated and stored for late usage and/or analysis. In some instances, the anomalous event module(s) 150 can be configured to provide notices and/or instructions to connected entities 140 and/or the connected vehicle 200.

For instance, the anomalous event module(s) 150 can be configured to send notices to connected vehicles in the driving environment. The particular vehicles that are sent the notices can be selected based at least in part on the nature of the anomaly event. For instance, if there is a car crash in one of the travel lanes, the anomalous event module(s) 150 can send notifications to connected vehicles approaching the location of the anomaly event or that will pass by the anomaly event along its route. On the other hand, if the anomaly event is an aggressive driver, the anomalous event module(s) 150 can send notifications to connected vehicles located along a projected route of the aggressive driver.

In some instances, the notification can inform connected vehicles of the anomaly event. The connected vehicles can present the notification to vehicle occupants in any suitable manner.

In some instances, the anomalous event module(s) 150 can send management instructions to the connected vehicles. The management instructions can include a different route to avoid the anomalous event. Alternatively, the management instructions can include commands that can be implemented by the connected vehicle to control the movement of the vehicle. The command can be a remote command for connected and autonomous vehicles.

Figure 2:
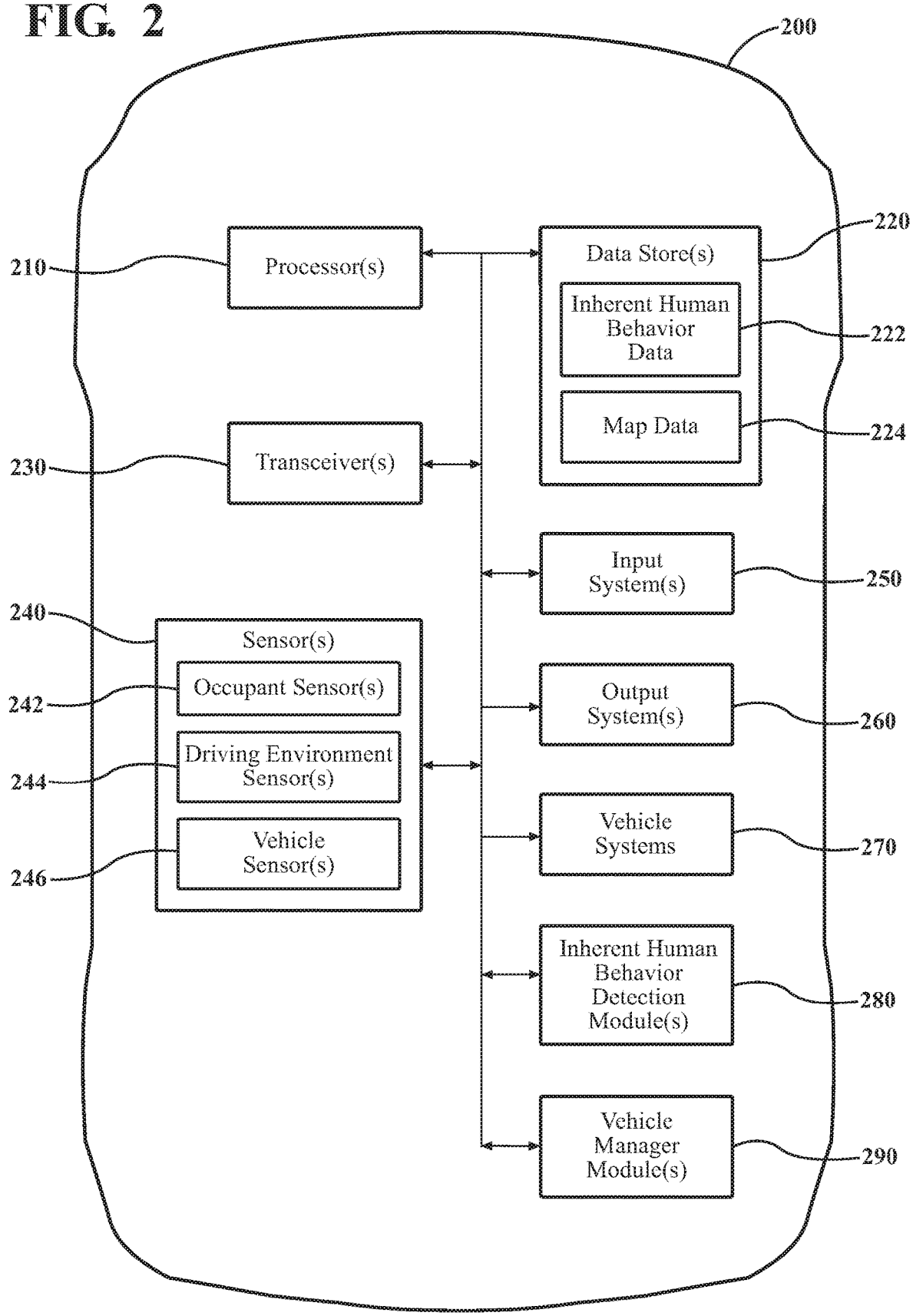
FIG. 2 is an example of a vehicle.

The connected vehicle 200 will now be described in greater detail. Referring to FIG. 2, an example of the connected vehicle 200 is shown. The term "vehicle" means any form of motorized transport, now known or later developed. Non-limiting examples of vehicles include automobiles, motorcycles, aerocars, or any other form of motorized transport. While arrangements herein will be described in connection with land-based vehicles, it will be appreciated that arrangements are not limited to land-based vehicles. Indeed, in some arrangements, the vehicle can be water-based or air-based vehicles. The connected vehicle 200 may be operated manually by a human driver, semi-autonomously by a mix of manual inputs from a human driver and autonomous inputs by one or more vehicle computers, fully autonomously by one or more vehicle computers, or any combination thereof. The connected vehicle 200 is "connected" in that it is communicatively coupled to the server(s) 130.

The connected vehicle 200 can include one or more processors 210 and one or more data stores 220. The above-discussion of the processors 110 and data stores 120 applies equally to the processors 210 and data stores 220, respectively.

The data store(s) 220 can include one or more inherent human behavior data 222. The inherent human behavior data 222 can include any information about whether certain sensor data would be indicative of an inherent human behavior. Examples of inherent human behavior can include rubbernecking or near-rubbernecking. The inherent human behavior data 222 can include information about vehicle occupant gaze patterns or ranges, eye tracking patterns or ranges, head position patterns or ranges. The inherent human behavior data 222 can be based on the particular occupant of the vehicle, a general population of vehicle occupants, or any suitable group of vehicle occupants. Rubbernecking can involve two aspects—(a) a deviation of a head position from a neutral head position, and (b) holding the deviated position for a period of time. A driver looking over his or her should to view a blind spot and then immediately turning his or head back to view the road would not be considered to be rubbernecking because the duration of the deviated head position does not meet a threshold level. "Near-rubbernecking" refers to a situation that is between rubbernecking and normal driving behavior. Such near-rubbernecking situations may still be indicative of an anomalous event in the driving environment.

The data store(s) 220 can include map data 224. The map data 224 can include maps of one or more geographic areas. In some instances, the map data 224 can include information or data on roads, traffic control devices, road markings, street lights, structures, features, and/or landmarks in the one or more geographic areas. The map data 224 can include measurements, dimensions, distances, positions, coordinates, and/or information for one or more items included in the map data 224 and/or relative to other items included in the map data 224. The map data 224 can include a digital map with information about road geometry. In one or more arrangement, the map data 224 can include information about the ground, terrain, roads, surfaces, and/or other features of one or more geographic areas. The map data 224 can include elevation data in the one or more geographic areas. The map data 224 can define one or more ground surfaces, which can include paved roads, unpaved roads, land, and other things that define a ground surface. The map data 224 can be high quality and/or highly detailed.

The connected vehicle 200 can include one or more transceivers 230. As used herein, "transceiver" is defined as a component or a group of components that transmit signals, receive signals or transmit and receive signals, whether wirelessly or through a hard-wired connection. The transceiver(s) 230 can enable communications between the connected vehicle 200 and other elements of the anomalous event system 100. The transceiver(s) 230 can be any suitable transceivers used to access a network, access point, node or other device for the transmission and receipt of data. The transceiver(s) 230 may be wireless transceivers using any one of a number of wireless technologies, now known or in the future.

The connected vehicle 200 can include one or more sensors 240. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the connected vehicle 200 includes a plurality of sensors, the sensors can work independently from each other. Alternatively, two or more of the sensors can work in combination with each other. In such case, the two or more sensors can form a sensor network.

The sensor(s) 240 can include any suitable type of sensor. Various examples of different types of sensors will be described herein. However, it will be understood that the embodiments are not limited to the particular sensors described.

The sensor(s) 240 can include one or more occupant sensors 242. The occupant sensor(s) 242 can be configured to detect, determine, assess, monitor, measure, quantify and/or sense information about a vehicle occupant and, more particularly, information indicative of whether the vehicle occupant is exhibiting an inherent human behavior. In some arrangements, the occupant sensor(s) 242 can be configured to monitor one or more vehicle occupants continuously, periodically, irregularly, or even randomly.

The occupant sensor(s) 242 can be any suitable sensor, now known or later developed. In one or more arrangements, the occupant sensor(s) 242 can include one or cameras, one or more occupant detection sensors (e.g., occupant presence, location, etc.), one or more eye and/or face sensor(s), one or more microphones, one or more weight sensors, one or more eye movement sensors, one or more eye tracking sensors, one or more head position sensors, and/or one or more gaze tracking sensors, just to name a few possibilities.

The sensor(s) 240 can include one or more environment sensors 244. Such sensors can be used to detect, determine, assess, monitor, measure, quantify, acquire, and/or sense, directly or indirectly, something about the external environment of the connected vehicle 200. For instance, one or more of the environment sensors 244 can be used to detect, determine, assess, monitor, measure, quantify, acquire, and/or sense, directly or indirectly, the presence of one or more objects in the external environment of the connected vehicle 200, the position or location of each detected object relative to the connected vehicle 200, the distance between each detected object and the connected vehicle 200 in one or more directions (e.g. in a longitudinal direction, a lateral direction, and/or other direction(s)), the elevation of a detected object, the speed of a detected object, the acceleration of a detected object, the heading angle of a detected object, and/or the movement of each detected obstacle.

The environment sensor(s) 244 can be any suitable sensor, now known or later developed. In one or more arrangements, the environment sensor(s) 244 can include one or more radar sensors, one or more lidar sensors, one or more sonar sensors, and/or one or more cameras.

The sensor(s) 240 can include one or more vehicle sensors 246. The vehicle sensor(s) 246 can detect, determine, assess, monitor, measure, quantify and/or sense information about the connected vehicle 200 itself (e.g., position, location, orientation, speed, acceleration, heading, etc.). The vehicle sensor(s) 246 can be any suitable sensor, now known or later developed.

The connected vehicle 200 can include an input system 250. An "input system" includes any device, component, system, element or arrangement or groups thereof that enable information/data to be entered into a machine. The input system 250 can receive an input from a vehicle occupant (e.g. a driver or a passenger). Any suitable input system 250 can be used, including, for example, a keypad, display, touch screen, multi-touch screen, button, joystick, mouse, trackball, microphone and/or combinations thereof.

The connected vehicle 200 can include an output system 260. An "output system" includes any device, component, system, element or arrangement or groups thereof that enable information/data to be presented to a vehicle occupant (e.g. a person, a vehicle occupant, etc.). The output system 260 can present information/data to a vehicle occupant. The output system 260 can include a display. Alternatively or in addition, the output system 260 may include an earphone and/or speaker. Some components of the connected vehicle 200 may serve as both a component of the input system 250 and a component of the output system 260.

The connected vehicle 200 can include one or more vehicle systems 270. The one or more vehicle systems 270 can include a propulsion system, a braking system, a steering system, throttle system, a transmission system, a signaling system, and/or a navigation system 275. Each of these systems can include one or more mechanisms, devices, elements, components, systems, and/or combination thereof, now known or later developed. The above examples of the vehicle systems 270 are non-limiting. Indeed, it will be understood that the vehicle systems 270 can include more, fewer, or different vehicle systems. It should be appreciated that although particular vehicle systems are separately defined, each or any of the systems or portions thereof may be otherwise combined or segregated via hardware and/or software within the connected vehicle 200.

The navigation system can include one or more mechanisms, devices, elements, components, systems, applications and/or combinations thereof, now known or later developed, configured to determine the geographic location of the connected vehicle 200 and/or to determine a travel route for the connected vehicle 200. The navigation system can include one or more mapping applications to determine a travel route for the connected vehicle 200. The navigation system can include a global positioning system, a local positioning system, or a geolocation system.

In one or more arrangements, the navigation system can include a global positioning system, a local positioning system or a geolocation system. The navigation system can be implemented with any one of a number of satellite positioning systems, now known or later developed, including, for example, the United States Global Positioning System (GPS). Further, the navigation system can use Transmission Control Protocol (TCP) and/or a Geographic information system (GIS) and location services.

The navigation system may include a transceiver configured to estimate a position of the connected vehicle 200 with respect to the Earth. For example, navigation system can include a GPS transceiver to determine the vehicle's latitude, longitude and/or altitude. The navigation system can use other systems (e.g. laser-based localization systems, inertial-aided GPS, and/or camera-based localization) to determine the location of the connected vehicle 200.

The connected vehicle 200 can include one or more modules, at least some of which will be described herein. The modules can be implemented as computer readable program code that, when executed by a processor, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively or in addition, one or more data store 220 may contain such instructions.

The connected vehicle 200 can include one or more modules, at least some of which will be described herein. The modules can be implemented as computer readable program code that, when executed by a processor, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively or in addition, one or more data store 220 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The connected vehicle 200 can include one or more inherent human behavior detection modules 280. The inherent human behavior detection module(s) 280 can be configured to receive sensor data from the sensor(s) 240, such as the occupant sensor(s) 242. The inherent human behavior detection module(s) 280 can be configured to analyze the data received from the occupant sensor(s) 242. For instance, the analysis can be performed by machine learning, machine vision, and/or deep learning techniques. In some instance, the inherent human behavior detection module(s) 280 can be configured to compare the data received from the occupant sensor(s) 242 to the inherent human behavior data 222. The inherent human behavior detection module(s) 280 can be configured to determine a probability or confidence level that an inherent human behavior has occurred. In some instances, the inherent human behavior detection module(s) 280 can be configured to compare a heading of the vehicle 200 to an occupant's gaze direction or head angle, as well as the duration of the occupant's gaze or head angle, to determine whether an inherent human behavior (e.g., rubbernecking or near-rubbernecking) has occurred.

If an inherent human behavior is detected in the data received from the occupant sensor(s) 242, the inherent human behavior detection module(s) 280 can be configured to send a notification 201 of an inherent human behavior detection to the server(s) 130. The notification 201 can include any suitable information. For instance, the notification 201 can include one or more images of the vehicle occupant. Alternatively or additionally, the notification 201 can include determine a probability or confidence level that an inherent human behavior has occurred. Still further, the notification 201 can include other information such as vehicle heading, occupant gaze direction, duration of the occupant's gaze, etc.

In some instances, the inherent human behavior detection module(s) can be configured to send driving scene data 146 to the server(s) 130. As noted above, the anomalous event module(s) 150 may send an upload request 152 for such information.

The connected vehicle 200 can include one or more vehicle manager modules 290. The vehicle manager module(s) 290 can be configured to receive management instructions from the server(s) 130. In response to receiving a management instruction, the vehicle manager module(s) 290 can take one or more actions. For instance, the vehicle manager module(s) 290 can present a notification to the driver and/or other vehicle occupants. As an example, the vehicle manager module(s) 290 can cause the notification to be presented on the output system(s) 255.

In some instance, vehicle manager module(s) 290 can be configured to receive a new routing or vehicle commands from the server(s) 130. In such case, the vehicle manager module(s) 290 can cause such commands to be implemented to control a movement of the connected vehicle.

Again, the connected vehicle 200 is described above separately from the connected entities 140 because the connected vehicle 200 is the vehicle that initially detected an inherent human behavior. However, the other connected vehicles 141 and the connected vehicle 200 can be configured with the same or substantially the same capabilities. Thus, it will be appreciated that the above discussion of the connected vehicle 200 can apply to the other connected vehicles 141. It will be appreciated that the above discussion of at least some aspects of the connected vehicle 200 can apply to the other connected entities 140. For instance, the infrastructure device(s) 142 can have at least some of the same elements shown in FIG. 2. Likewise, the connected personal device(s) 143 can include at least some of the same elements shown in FIG. 2.

Now that the various potential systems, devices, elements and/or components of the anomalous event system 100 have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Turning to FIG. 3, an example of a method 300 for detecting and/or validating anomalous events in a driving environment is shown. At block 310, a notification of an anomalous event can be received from an initial connected entity in the driving environment. The notification 201 can be received by the server(s) 130. In some arrangements, the initial connected entity can be a connected vehicle 200. In such case, the notification 201 can indicate that an inherent human behavior by an occupant of the connected vehicle 200 has been detected. Alternatively, the initial connected entity can be a communication personal device 143 (e.g., a smart phone, tablet computer, etc.) or a connected vehicle 141. One or more application software programs, such as a navigation program (Google Maps, Waze, etc.), can be running on the initial connected entity. A user may provide an input on the connected entity, indicating a certain condition (e.g., "accident", "construction", etc.). In some instances, the user can be presented with a list of conditions to select from. In such case, the user can provide a touch or audial input to select one of the conditions. The application will want to validate this input to ensure that the crowdsourced information is not bogus. The method 300 can continue to block 320.

At block 320, an inquiry 131 can be sent to one or more connected entities 140 spatiotemporally related to the connected vehicle 200 as to whether any person associated with the one or more connected entities 140 is exhibiting an inherent human behavior. The inquiry 131 can be sent by the server(s) 130. The method 300 can continue to block 330.

At block 330, responses 145 to the inquiry 131 can be received from at least one of the one or more connected entities 140. When a threshold level of responses 145 are received that indicate that an inherent human behavior has been detected by a person associated with the respective connected entity 140, the respective connected entities 140 can be caused to upload driving scene data 146. The causing can be performed by the server(s) 130. The driving scene data 146 can be for at least the time when the connected entity 140 was at or near the location of the connected vehicle 200 when the inherent human behavior by the occupant of the connected vehicle 200 was detected.

The method 300 can end. Alternatively, the method 300 can return to block 310 or to some other block. The method 300 can be repeated at any suitable point, such as at a suitable time or upon the occurrence of any suitable event or condition.

Figure 4A:
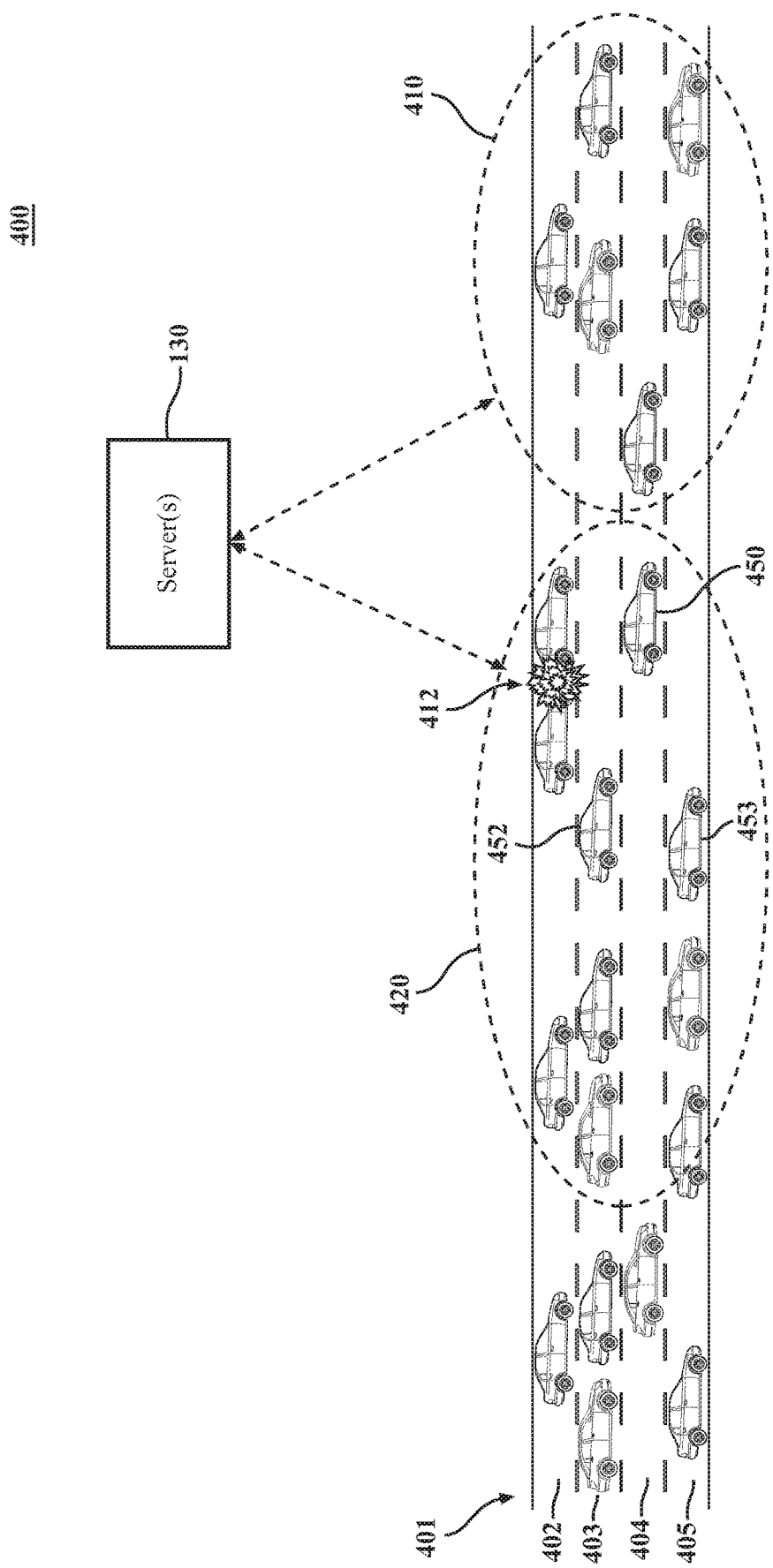
FIG. 4A is an example of a driving scenario, showing the detection of an anomalous event.
Figure 4B:
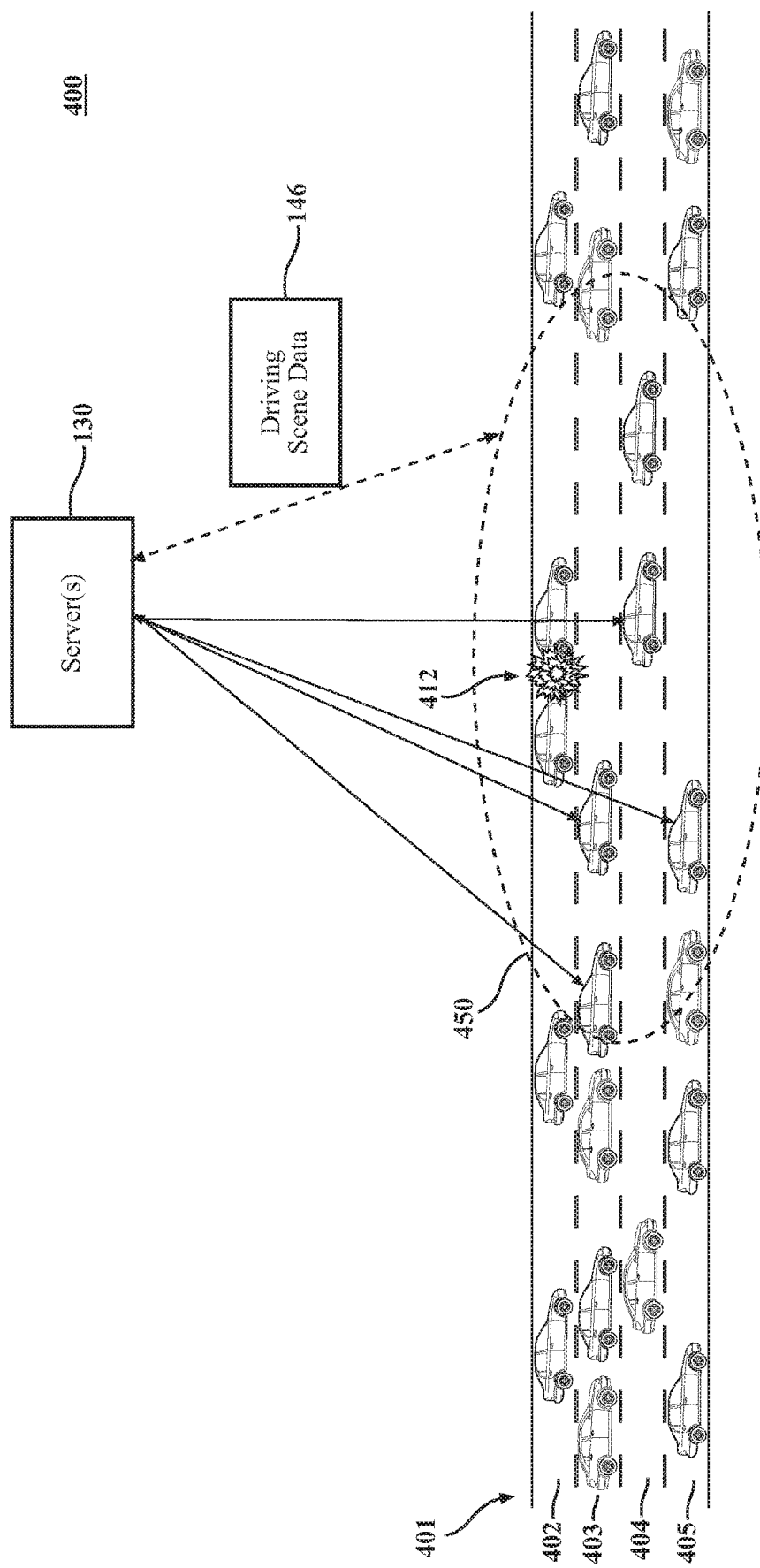
FIG. 4B is an example of the driving scenario of FIG. 4A, showing the management of the anomalous event.

Non-limiting examples of the operation of the arrangements described herein will now be presented. Referring to FIGS. 4A-4B, an example of a driving scenario is shown. In this example, the anomaly is a static anomaly, and the inherent human behavior is rubbernecking.

Referring to FIG. 4A, a driving environment 400 is shown. The driving environment 400 can include a road 401 with four travel lanes—a first travel lane 402, a second travel lane 403, a third travel lane 404, and a fourth travel lane 405. There can be a plurality of vehicles on the road at the moment in time shown. At least some of the vehicles can be connected vehicles. Some of the vehicles may also be non-connected vehicles.

As is shown, there can be a crash 412 between two vehicles in the first travel lane 402. When vehicle 450 is near the crash 412, the driver of vehicle 450 can rubberneck to view the crash 412. One or more occupant sensors 242 can be continuously monitoring the driver of vehicle 450. Based on occupant data acquired by the occupant sensor(s) 242, vehicle 450 can detect the inherent human behavior (rubbernecking) of the driver. When the rubbernecking is detected, vehicle 450 can send a notification to the server(s) 130, indicating that an inherent human behavior has been detected. The notification can include location information and/or temporal information (e.g., a time stamp). In some instances, the notification can include an image of the driver. This image can be used to confirm the detection of rubbernecking.

In response to receiving the notification, the server(s) 130 can send an inquiry to other nearby connected vehicles. For instance, the server(s) 130 can send an inquiry to connected vehicles at or near the location of the crash 412 or upstream of the crash 412 (e.g., the vehicles shown in the boundary 420). These inquiries can explore whether any occupants of the other connected vehicles exhibited an inherent human behavior at or near the crash. Alternatively or in addition, the server can send an inquiry to connected vehicles that have already passed the crash 412 (e.g., the vehicles shown in the boundary 410). These inquiries can explore whether any occupants of the other connected vehicles exhibited an inherent human behavior when they passed the location of the crash 412. The inquiry can prompt or cause the connected vehicles to analyze its occupant data to detect whether an inherent human behavior occurred or is occurring. One or more of the connected vehicles can send responses to the inquiry. For instance, vehicles 452, 453 can detect an inherent human behavior. As a result, vehicles 452, 453 can respond to the inquiry.

Referring to FIG. 4B, when a threshold level of responses to the inquiry are received that indicate that an inherent human behavior has been detected by a person associated with the respective connected entity, the respective connected entities can be caused to upload driving scene data 146. For instance, the server(s) 130 can send a command or a request to the connected vehicles to upload their data. If a threshold level of responses is not met, then the server(s) 130 may take no further action.

The uploaded driving scene data can be analyzed to identify the type of anomalous event in the driving environment. In one or more arrangements, the server(s) 130 can analyze the driving scene data 146 to identify the type of anomalous event. For instance, the analysis can be performed by machine learning, machine vision, and/or deep learning techniques. In some instances, the server(s) 130 can request human review of the driving scene data 146 to identify the type of anomalous event. In this example, the server(s) 130 and/or human reviewers can identify the anomalous event being a car crash. The anomalous event can be identified as being static in nature.

It should be noted that, in some instances, the server(s) 130 can request assistance from connected vehicles in identifying the anomalous event. For instance, the server(s) 130 can cause an inquiry to be presented within the connected vehicle to a vehicle occupant. The inquiry can be presented by the output system(s) 255 of the connected vehicle. In some instances, the inquiry can ask whether there is an anomalous event in the environment and/or the nature of the event. For instance, the inquiry can present a set of predefined possibilities to the user to select.

Once the anomalous event has been identified, the server(s) 130 can take one or more anomalous event management actions. For instance, the server(s) 130 can send notifications and/or instructions, in any suitable format, to connected vehicles that are approaching the crash 412. The notification can provide information about the crash. Alternatively or additionally, the instructions can provide the connected vehicles with routing information to avoid the crash 412. In some instances, the server(s) 130 can send commands to control one or more aspects of the connected vehicles.

Figure 5:
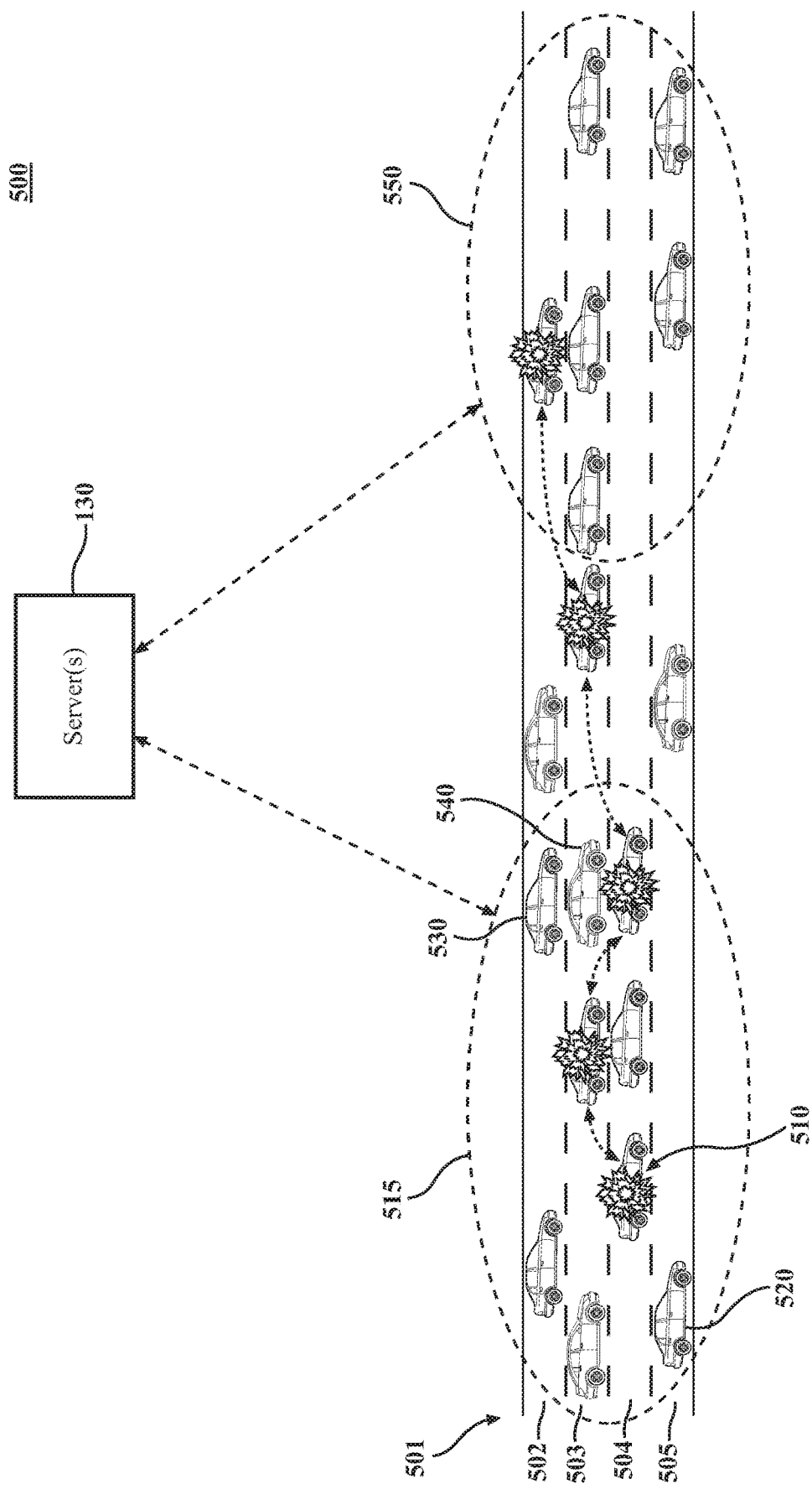
FIG. 5 is an example of a driving scenario, showing the dynamic tracking of an anomalous event.

Referring to FIG. 5, an example of a driving scenario is shown. In this example, the anomaly is a dynamic anomaly and, more particularly, an aggressive driver. FIG. 5 shows a driving environment 500. The driving environment 500 can include a road 501 with four travel lanes—a first travel lane 502, a second travel lane 503, a third travel lane 504, and a fourth travel lane 505. There can be a plurality of vehicles on the road at the moment in time shown. At least some of the vehicles can be connected vehicles. Some of the vehicles may also be non-connected vehicles.

A vehicle 510 can be behaving aggressively in the driving environment 500. FIG. 5 generally shows the path of the vehicle 510 over time. The aggressive behavior can be exhibited by frequent lane changes, tailgating, rude driver gestures, and/or cutting off other vehicles. As the vehicle 510 comes near the other connected vehicles in the driving environment 500, the drivers of those connected vehicles may exhibit an inherent human behavior. For instance, the driver of vehicle 520 can rubberneck to view the aggressive driver. One or more occupant sensors 242 of the vehicle 510 can be continuously monitoring the driver. The vehicle 510 can detect the rubbernecking behavior of the driver based on occupant data acquired by the one or more occupant sensors 242. When the rubbernecking is detected, the vehicle 510 can send a notification 201 of inherent behavior detection to the server(s) 130.

Alternatively, a driver can provide an input on the input system 250 of the connected vehicle 200 or on a communication device to inform the server(s) of the existence of an aggressive driver. For instance, a driver of the connected vehicle 200 can push a button to indicate an aggressive driver is in the driving environment. In such case, the connected vehicle 200 can send a notification to the server(s) 130 based on the input, thereby informing the server(s) 130 about the existence of an aggressive driver.

In addition to the above examples, it should be noted that arrangements described herein can be used to validate crowdsourced information. When a user of a navigation application (e.g., Waze) presses a button for "accident" or "construction", the application wants to validate the crowdsourced information to ensure that it is not bogus. Arrangements described herein can be used to check if rubbernecking or other inherent human behaviors are observed by connected entities that are spatiotemporally related. In this way, more trust can be added to the crowdsourced information.

In response to receiving the notification 201, the server(s) 130 and/or the anomalous event module(s) 150 can send an inquiry to other connected vehicles spatiotemporally related to the vehicle 510. For instance, the server(s) 130 and/or the anomalous event module(s) 150 can send an inquiry to vehicles at or near or slightly upstream of the initial detection of the anomalous event (e.g., the vehicles shown in the boundary 515). These inquiries can explore whether any occupants of the other connected vehicles exhibited an inherent human behavior. For instance, vehicles 530, 540 may detect inherent human behaviors by one or more of vehicle occupants.

The server(s) 130 and/or the anomalous event module(s) 150 may determine that the anomalous event is an aggressive driver and that the anomalous event is dynamic in nature. In such case, the server(s) 130 and/or the anomalous event module(s) 150 can recognize the general direction of travel of the aggressive driver. The server(s) 130 and/or the anomalous event module(s) 150 can cause a notification to be sent to connected vehicles ahead of the aggressive driver in the travel direction of the road, such as those vehicles located within the boundary 550. The notification can indicate that an aggressive driver is approaching and to take appropriate action. In some instances, the server(s) 130 and/or the anomalous event module(s) 150 can send routing instructions for the connected vehicles to avoid the aggressive driver.

The above examples described in connection with FIGS. 4A-4B and 5 are directed to scenarios in which the detection of anomalous event is used to manage vehicles, individually or as a group, with respect to the anomaly. However, it will be appreciated that arrangements described herein can be used for other purposes. As an example, arrangements described herein can be used to provide information or feedback to advertisers and/or government entities on the effectiveness and/or visibility of signs. For instance, inherent human behaviors may reveal which advertising billboards receive more attention from vehicle occupants. Such information can be useful to advertisers in evaluating their displays. Further, a city or other governmental entity may use arrangements described herein to assess the effectiveness of a signage at drawing the attention of a driver and/or how visible a sign is to drivers. Information acquired according to arrangements herein can be used by such entities to adjust sign content, placement, and/or visibility.

It will be appreciated that arrangements described herein can provide numerous benefits, including one or more of the benefits mentioned herein. For example, arrangements described herein can leverage inherent human behavior to watch repulsive things to detect anomalous events in a driving environment. Arrangements described herein can facilitate a human-machine collaboration. Arrangements described herein can result in a quality data set by taking advantage of the ability of human being to identify interesting driving scenes and reading context by crowd and also by taking advantage of the ability of machines to capture a driving scene and upload the data. Arrangements described herein can result in the detection and capture of useful data about a driving environment. Arrangements described herein can initiate anomalous event detection based on inherent human behavior. Arrangements described herein can minimize vulnerability to being fooled by fake data. Arrangements described herein can be used to validate crowd-sourced information, such as from a navigation application. Arrangements described herein can add a level of trust to crowdsourced information.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A method of detecting and/or validating an anomalous event in a driving environment, the method comprising:
   receiving, from an initial connected entity in the driving environment, a notification of the anomalous event;
   sending an inquiry to one or more connected entities spatiotemporally related to the initial connected entity as to whether any person associated with the one or more connected entities is exhibiting an inherent human behavior; and
   when a threshold level of responses to the inquiry are received from one or more of the one or more connected entities indicating that an inherent human behavior has been detected, causing the one or more connected entities to upload driving scene data for at least a time when the inherent human behavior was detected.

2. The method of claim 1, wherein the initial connected entity is a connected vehicle, and wherein receiving a notification of an anomalous event includes receiving a notification that an inherent human behavior by an occupant of the connected vehicle has been detected.

3. The method of claim 1, wherein the initial connected entity is a communication device, and wherein receiving a notification of an anomalous event includes receiving a notification that a user has provided an input on the communication device indicating an anomalous event.

4. The method of claim 1, wherein the inherent human behavior is rubbernecking or near-rubbernecking.

5. The method of claim 1, wherein the connected entities includes at least one of: one or more connected vehicles, one or more connected infrastructure devices, and one or more connected personal devices.

6. The method of claim 1, further including analyzing the driving scene data, using machine learning or deep learning techniques, to detect an anomalous event in the driving environment.

7. The method of claim 6, wherein the anomalous event is one of a car accident or an aggressive driver.

8. The method of claim 1, further including sending the driving scene data for review by a human to identify an anomalous event in the driving environment.

9. The method of claim 8, further including receiving, from the human, at least one of annotated driving scene data and instructions, whereby a machine learning or deep learning model learns to capture the anomalous event based on the at least one of annotated driving scene data and instructions.

10. The method of claim 1, further including determining whether the anomalous event is static or dynamic.

11. The method of claim 1, further including sending a notification or instructions to one or more connected entities based on the anomalous event.

12. The method of claim 1, further including sending an inquiry to one or more connected entities that have passed the anomalous event as to whether any person associated with the one or more connected entities exhibited an inherent human behavior when at or near the anomalous event.

13. The method of claim 1, wherein the threshold level is based on real-time conditions in the driving environment.

14. A system for detecting an anomalous event in a driving environment, the system comprising:
   one or more processors, the one or more processors being programmed to initiate executable operations comprising:
      receiving, from an initial connected entity in the driving environment, a notification of an anomalous event;
      sending an inquiry to one or more connected entities spatiotemporally related to the initial connected entity as to whether any person associated with the one or more connected entities is exhibiting an inherent human behavior; and
      when a threshold level of responses to the inquiry are received from one or more of the one or more connected entities indicating that an inherent human behavior has been detected, causing the one or more connected entities to upload driving scene data for at least a time when the inherent human behavior was detected.

15. The system of claim 14, wherein the initial connected entity is a connected vehicle, and wherein receiving a notification of an anomalous event includes receiving a notification that an inherent human behavior by an occupant of the connected vehicle has been detected.

16. The system of claim 14, wherein the initial connected entity is a communication device, and wherein receiving a notification of an anomalous event includes receiving a notification that a user has provided an input on the communication device indicating an anomalous event.

17. The system of claim 14, wherein the inherent human behavior is rubbernecking or near-rubbernecking.

18. The system of claim 14, wherein in the connected entities includes connected vehicles, connected infrastructure devices, and connected personal devices.

19. The system of claim 14, further including analyzing the driving scene data, using machine learning or deep learning techniques, to detect an anomalous event in the driving environment.

20. The system of claim 14, further including sending the driving scene data to a human reviewer to identify an anomalous event in the driving environment.

21. The system of claim 20, further including receiving, from the human, at least one of annotated driving scene data and instructions, whereby a machine learning or deep learning model learns to capture the anomalous event based on the at least one of annotated driving scene data and instructions.

22. The system of claim 14, further including determining whether the anomalous event is static or dynamic.

23. The system of claim 14, further including sending a notification or instructions to one or more connected entities based on the anomalous event.

24. The system of claim 14, further including sending an inquiry to one or more connected entities that have passed the anomalous event as to whether any person associated with the one or more connected entities exhibited an inherent human behavior when at or near the anomalous event.

25. The system of claim 14, wherein the threshold level of responses is based on real-time conditions in the driving environment.

26. A computer program product for detecting and/or validating an anomalous event in a driving environment, the computer program product comprising a computer readable storage medium having program code embodied therewith, the program code executable by a processor to perform a method comprising:

- receiving, from an initial connected entity in the driving environment, a notification of an anomalous event;
- sending an inquiry to one or more connected entities spatiotemporally related to the initial connected entity as to whether any person associated with the one or more connected entities is exhibiting an inherent human behavior; and
- when a threshold level of responses indicate that an inherent human behavior has been detected by a person associated with the connected entity, causing the connected entities to upload driving scene data for at least a time when the inherent human behavior was detected.

\* \* \* \* \*